F. GRUNDY.
REMOVABLE TOP FOR VEHICLES.
APPLICATION FILED JAN. 18, 1915.
1,190,153.
Patented July 4, 1916.
2 SHEETS—SHEET 1.
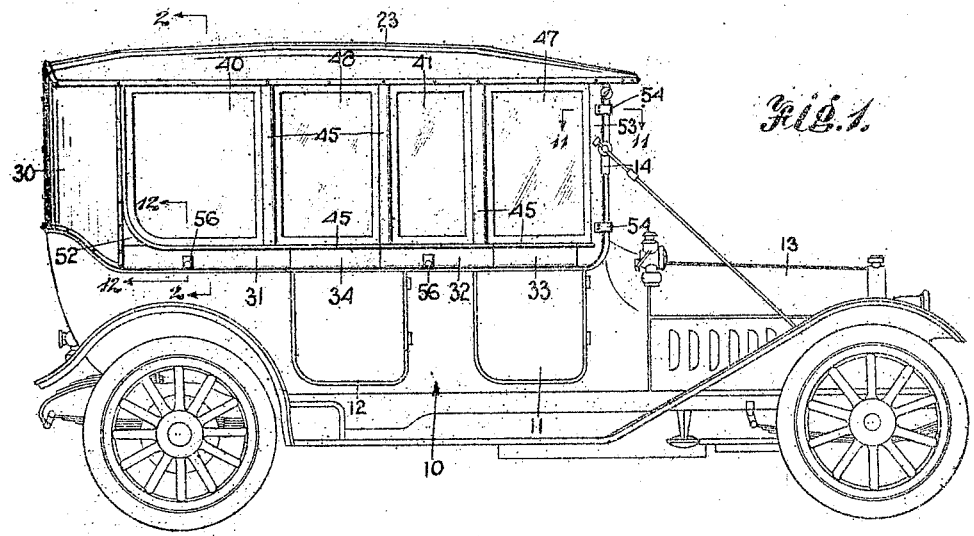
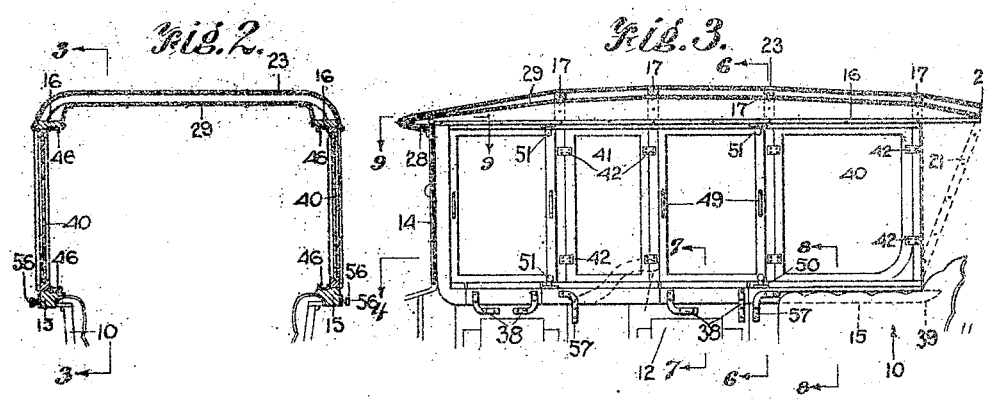
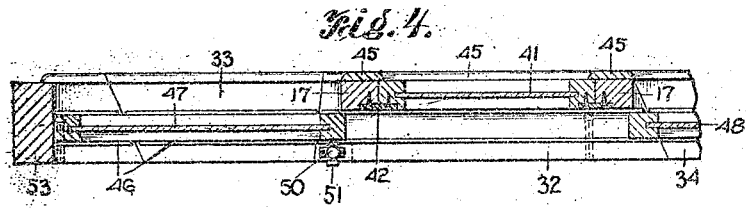
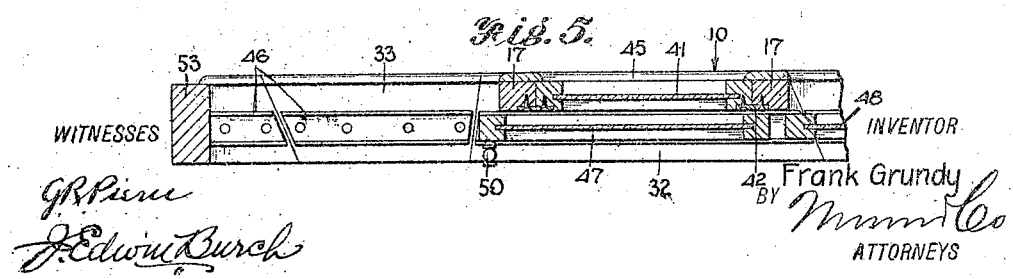
WITNESSES
G. R. Pierce
J. Edwin Burch
INVENTOR
Frank Grundy
BY
ATTORNEYS F. GRUNDY.
REMOVABLE TOP FOR VEHICLES.
APPLICATION FILED JAN. 18, 1915.
1,190,153.
Patented July 4, 1916.
2 SHEETS—SHEET 2.
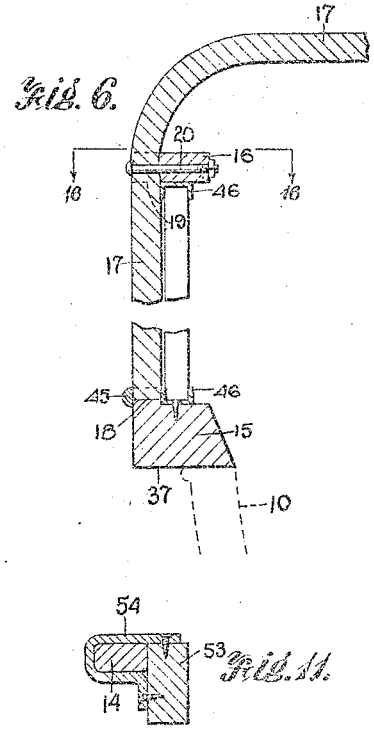
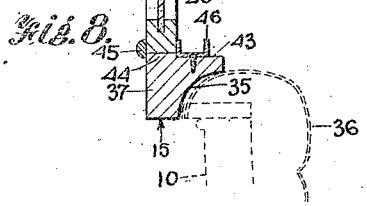
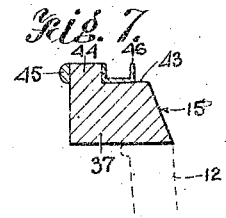
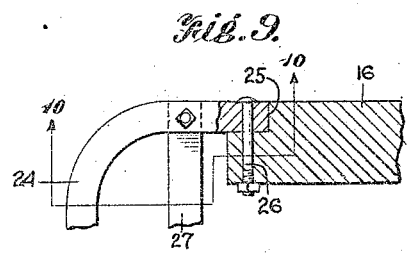
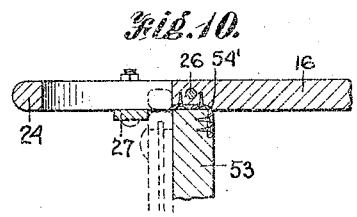
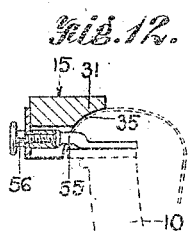
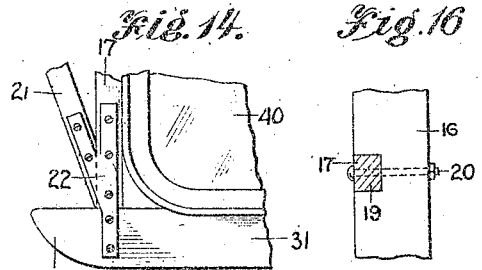
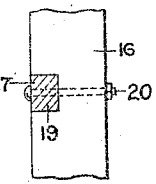
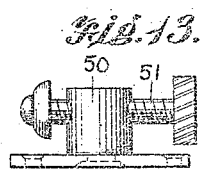
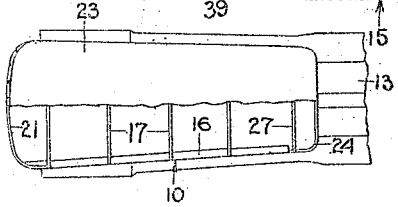
WITNESSES
G. R. Pierce
Edwin Burch
INVENTOR
Frank Grundy
BY
ATTORNEYS

UNITED STATES PATENT OFFICE.

FRANK GRUNDY, OF JERSEY CITY, NEW JERSEY.

REMOVABLE TOP FOR VEHICLES.

1,190,153.  Specification of Letters Patent.  Patented July 4, 1916.

Application filed January 18, 1915. Serial No. 2,824.

*To all whom it may concern:*

Be it known that I, FRANK GRUNDY, a citizen of the United States, and a resident of Jersey City, in the county of Hudson and State of New Jersey, have invented a new and Improved Removable Top for Vehicles, of which the following is a full, clear, and exact description.

This invention relates to the class of vehicles such as automobiles and the invention comprehends an improved top for automobiles by which a car having an open body can be converted into one of the limousine type particularly adapted for winter use or in cold and inclement weather.

A further object of the invention is to provide a removable top of the class described in which provision is made for the convenient attachment and removal of the device to and from the body of the car after the ordinary folding top has been removed, to cause a snug fit between the parts in order to protect the occupants but still permit and insure perfect ventilation, this latter object being assisted by the provision of sliding windows adjacent to the doors of the car and mounted in a novel manner, while permitting entrance to and exit from the car.

Another object of the invention is to provide a top in which the usual folded or other top is supplemented and replaced by a new top and cover as a part of the whole inclosure, without allowing the folding bows to remain and to detract from the appearance of the car, so that the top, including the cover, will taper with the body instead of allowing a space between the inclosure and the downturned sides of the cover, as is common where the usual cover is retained and an inclosure fitted between it and the body. With the above and other objects in view, the invention resides in the peculiar combination and arrangement of parts to be hereinafter more fully described, illustrated and claimed, it being also an object to provide a device which is simple in construction, durable and efficient in operation and not likely to get out of order.

Reference is to be had to the accompanying drawings forming a part of this specification, in which similar characters of reference indicate corresponding parts in all the views and in which—

Figure 1 is a side elevation of an automobile equipped with my improved removable top; Fig. 2 is a vertical cross sectional view taken on the line 2—2 of Fig. 1; Fig. 3 is a longitudinal sectional view taken on the line 3—3 of Fig. 2; Fig. 4 is a horizontal longitudinal fragmentary sectional view of the front portion of the car taken on the line 4—4 of Fig. 3; Fig. 5 is a similar view with the sliding window in an open position as distingushed from the closed position thereof shown in Fig. 4; Fig. 6 is a vertical cross sectional view taken on the line 6—6 of Fig. 3; Fig. 7 is a similar view taken on the line 7—7 of Fig. 3; Fig. 8 is a similar view taken on the line 8—8 of Fig. 3; Fig. 9 is a sectional view taken on the line 9—9 of Fig. 3; Fig. 10 is a sectional view taken on the line 10—10 of Fig. 9; Fig. 11 is a horizontal sectional view taken on the line 11—11 of Fig. 1; Fig. 12 is a vertical sectional view taken on the line 12—12 of Fig. 1; Fig. 13 is a detail view of a device for holding the sliding windows against movement; Fig. 14 is a detail fragmentary elevation showing the manner of bracing the rear bow of the top; Fig. 15 is a diagrammatic plan view of the top as applied to an automobile, a portion of the cover being broken away; Fig. 16 is a horizontal sectional view taken on the line 16—16 of Fig. 6.

In the drawings the numeral 10 designates the body of an automobile of the touring car type, which is provided with the usual fore door 11 and rear doors 12 adapted to permit entrance to and exit from the interior or body of the car in the usual way. The ordinary folding top of the car is removed from the body for the application of my improved automobile top, but at the front portion of the body in rear of the bonnet or hood 13 the usual wind shield 14 is mounted to extend vertically.

The improved top includes opposite bottom bars 15 and top bars 16 which at spaced points are provided with bows 17 the lower ends of which seat directly upon the bottom bars, as shown at 18, while the upper bars are notched, as shown at 19, the notches communicating with their outer edges to receive the sides of the bows which are clamped thereto as by means of bolts 20 so that the outer edges of the bars and bows will lie flush. The bows 17 are vertically disposed and four of such bows are preferably employed adjacent to the vertical edges of the doors and at the rear portion of the body where the latter curves upwardly, but in addition thereto an inclined bow 21 is employed which is fastened to the rear bow 17 and to the lower bars 15 in any suitable way, as by means of angle braces 22.

A cover 23 is fastened to the bows, said cover extending over a front bow 24 which is horizontally disposed and has its rear extremities seated in notches in the forward ends of the upper bars 16, as shown at 25, and bolted thereto as shown at 26. The cover after passing over the horizontal front bow 24 is connected to a cross brace 27 detachably connected at its ends to the sides or attaching ends of said front bow, as shown at 28 in Fig. 3 of the drawings, so as to come in contact with the top of the wind shield and close the space between the latter and the front bow. The front bow serves in the nature of an out-rigger and projects over the wind shield to provide a device of better appearance as well as to protect the portion of the wind shield through which view is had as an aid in running the car in inclement weather. A lining 29 is also provided for the top, the same fitting the inner edges of the bows 17 and 21 and the inner edges of the upper bars 16 and suitably attached thereto, while a back portion 30 extends between the sides of the rearmost bow 17 over the bow 21 and connects with the body, this back portion being made of cloth, metal or other material which can be cut to conform to the shape of the body.

The upper bars 16 are each of one piece formation, preferably of rectangular cross section, and are relatively flat and wide, while the lower bars are cut to provide or comprise rear sections 31, intermediate sections 32 and front and rear door sections 33 and 34, respectively, one of the sections 33 being provided if a fore door is provided on one side only and two of such sections being provided if there are two fore doors. The rear sections 31 at their forward ends terminate at the rear edges of the rear door openings and the intermediate sections 32 preferably overlie both of the door openings, and said sections 31 and 32 are recessed at their inner corners, as shown at 35, to fit the sides of the body including the upholstery or padding 36 thereof, while the sections 33 and 34 over the doors have flat bottom portions 37 contacting with the upper edges of the doors and secured thereto in any suitable manner, such as shown at 38, by braces, so as to move with the doors as the latter are swung to open and closed positions. The rear extremities of the sections 31 are curved, as shown at 39, in order to conform to the shape of the body adjacent to the point of attachment of the rearmost bow 17 and the bow 22 inwardly of the back portion 30, the back portion at its side edges being attached to the rearmost bow 17.

Permanently secured between the upper and lower bars and the adjacent bows to the bar sections 31 and 32 are glazed sashes 40 and 41 respectively, the same lying flush with the outer faces of said bars and bows and secured in position, as to the sides of the bows, through the medium of securing plates 42 so that the bars will project inwardly thereof. For this purpose the lower bars are preferably rabbeted on their inner edges as shown at 43 to provide vertical extensions or upstanding parts 44 at their outer edges upon which the stationary sashes 40 and 41 rest, there being suitable molding or weather strips 45 overlying the coacting vertical edges of the sashes and bows and the lower edges of said sashes and their bar sections. In the rabbeted or recessed portions 43, as well as the bottom faces of the upper bars 16 inwardly of the sashes, guideways are provided each made in the form of channel-shaped strips 46 suitably secured thereto in order to slidably mount glazed sashes 47 and 48 which are located above the doors when in closed position and which are designed to be opened by moving the same rearwardly, as shown in Figs. 4 and 5 of the drawings, inside of the stationary sashes to permit ingress and egress to and from the car by permitting the doors, together with the door sections 33 and 34, to be swung therewith. The door and bar sections are cut on a bevel, as shown in Figs. 4 and 5, to permit the latter operation and the movable sashes are provided with handles 49 at their front and rear edges to permit them to be grasped on the inside for sliding the same.

When the movable sashes are closed, as shown in Fig. 4, the joints are sufficiently tight to protect the occupants but to insure perfect ventilation. In order to hold the sashes in closed position clamping devices are mounted on the lower bars inwardly of the guideways, the same comprising threaded bearings 50 with clamping screws 51 operating therethrough and having enlarged engaging ends to contact with the inner faces of the sashes at their rear sides. If the sashes 40 are curved at their lower rear corners filling blocks 52 are inserted between said curved portions and the lower bars 15, and at the front of the top inserts 53 are provided which are clamped to the wind shield frame as by loop straps 54 and to the upper bars 16, as shown at 54′ in Fig. 10 of the drawings, and adapted to be engaged by the sashes 47 when the latter are closed. The whole device as thus constructed is capable of removable attachment to the body of the car as by means of threaded stems 55 attached to the body beneath the stationary sections 31 and 32 of the lower bars 15 and coupled to said bars by clamping nuts 56. If desired, however, in order to render the structure more permanent the sections 31 and 32 may be secured to the body at the inside by means of braces 57.

From the foregoing description in connection with the accompanying drawings it will be seen that a device has been provided which obviates the disadvantages in construction, appearance and application over inclosures which are fitted between the body and the ordinary folding top, and that a strong device of neat appearance is provided. This is due to the fact that the inclosure, including the cover, by conforming to the body and tapering therewith as shown in Fig. 15 of the drawings, obviates the necessity of providing a space between the inclosure and the sides of the usual top and supporting bows thereof, where such inclosure is employed with the usual construction of tops which are of even width throughout their length, while the bodies are tapered. Furthermore, advantage is claimed over the ordinary permanent top in which slidable sashes are now provided but in which the doors include glass panels which open therewith without affording any convenient means of ventilation.

Having thus described my invention, what I claim as new and desire to secure by Letters Patent is:—

1. The combination with an automobile body having swinging doors and a wind shield: of a removable top including opposite longitudinal upper and lower bars, said lower bars being designed to fit the body and being divided into sections certain of which are connected to the doors to move therewith, means to detachably secure the other sections to the body, bows at spaced points along said top and having side portions with their lower extremities resting upon the lower bars beyond the movable sections thereof, said upper bars being notched to receive said bows, a covering over the bows, a lining therefor, a front bow between the upper bars over which said lining passes to connect with the wind shield, sections contiguous with the lower bars and connected to the sides of the wind shield, guideways on the bottom faces of the upper bars and the top faces of the lower bars, stationary sashes secured between the sides of the bows and the upper and lower bars beyond the doors in watertight connection therewith and sashes movable in the guideways for operation over the doors to close the spaces between the first named sashes and between the forwardmost of said sashes and the sections at the wind shield.

2. The combination with an automobile body having swinging doors and a wind shield; of a removable top including opposite longitudinal upper and lower bars, said lower bars being designed to fit the body and being divided into sections certain of which are connected to the doors to move therewith, means to detachably secure the other sections to the body, bows at spaced points along said top and having side portions with their lower extremities resting upon the lower bars beyond the movable sections thereof, said upper bars being notched to receive said bows, a covering over the bows, a lining therefor, a front bow between the upper bars over which said lining passes to contact with the wind shield, sections contiguous with the lower bars and connected to the sides of the wind shield, guideways on the bottom faces of the upper bars and the top faces of the lower bars, stationary sashes secured between the sides of the bows and the upper and lower bars flush with the outer faces thereof, other sashes slidably in the guideways for movement beyond the first named sashes and doors when closed to span the sections and guideways adjacent thereto and adapted to be opened rearwardly inside of said first named sashes clear of said doors and means to hold said sashes in closed position.

In testimony whereof I have signed my name to this specification in the presence of two subscribing witnesses.

FRANK GRUNDY.

Witnesses:
JOHN E. BURCH,
PHILIP D. ROLLHAUS.